United States Patent
Ramakrishna et al.

(10) Patent No.: US 12,494,832 B2
(45) Date of Patent: Dec. 9, 2025

(54) TRANSMISSION OF CHANNEL STATE INFORMATION REFERENCE SIGNALS

(71) Applicant: Rakuten Symphony, Inc., Tokyo (JP)

(72) Inventors: Raghavendra Ramakrishna, Bangalore (IN); Ronak Lalwala, Bangalore (IN); Vivek Jha, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/014,683

(22) PCT Filed: Dec. 23, 2022

(86) PCT No.: PCT/US2022/082352
§ 371 (c)(1),
(2) Date: Jan. 5, 2023

(87) PCT Pub. No.: WO2024/102164
PCT Pub. Date: May 16, 2024

(65) Prior Publication Data
US 2024/0243793 A1 Jul. 18, 2024

(30) Foreign Application Priority Data
Nov. 9, 2022 (IN) .............................. 202241063907

(51) Int. Cl.
*H04B 7/06* (2006.01)
(52) U.S. Cl.
CPC ........... *H04B 7/0626* (2013.01); *H04B 7/066* (2013.01)

(58) Field of Classification Search
CPC ..... H04B 7/0626; H04B 7/066; H04L 5/0007; H04L 5/0094; H04L 5/005
See application file for complete search history.

(56) References Cited

U.S. PATENT DOCUMENTS

| | | | |
|---|---|---|---|
| 2012/0113816 A1* | 5/2012 | Bhattad | H04L 25/0226 370/246 |
| 2015/0319718 A1* | 11/2015 | Yang | H04W 76/15 370/252 |

(Continued)

FOREIGN PATENT DOCUMENTS

WO  WO-2021163394 A1  8/2021

OTHER PUBLICATIONS

3GPP TS 38.211, 3rd Generation Partnership Project, Technical Specification Group Radio Access Network, NR, Physical channels and modulation (Release 17), Sep. 2022.

(Continued)

*Primary Examiner* — Christine Ng
(74) *Attorney, Agent, or Firm* — Sughrue Mion, PLLC

(57) ABSTRACT

In general, the current subject matter relates to transmission of channel state information reference signals (CSI RSs). In some implementations, a message can be received at a radio unit (RU) of a base station in a wireless communication system. The message can include channel state information reference signal (CSI RS) configuration information that the RU is configured to use in generating a CSI RS for transmission to a user equipment (UE). The CSI RS configuration information can include a plurality of parameters including a bandwidth for CSI RS transmission, amplitude scaling, and a scrambling identity (ID).

20 Claims, 13 Drawing Sheets

(56) References Cited

U.S. PATENT DOCUMENTS

| | | | |
|---|---|---|---|
| 2018/0337757 A1* | 11/2018 | Noh | H04L 27/26 |
| 2018/0368035 A1* | 12/2018 | Huang | H04L 5/0057 |
| 2019/0357159 A1 | 11/2019 | Pan et al. | |
| 2021/0105753 A1 | 4/2021 | Zhang et al. | |
| 2021/0120531 A1 | 4/2021 | Jeon et al. | |
| 2021/0250073 A1* | 8/2021 | Huang | H04L 1/0026 |
| 2021/0288773 A1* | 9/2021 | Lin | H04W 56/001 |
| 2021/0352526 A1* | 11/2021 | Kim | H04L 69/04 |
| 2022/0247474 A1* | 8/2022 | Rune | H04B 7/0617 |
| 2022/0345417 A1 | 10/2022 | Kasichainula et al. | |
| 2023/0115400 A1* | 4/2023 | Jeon | H04W 72/29 370/235 |
| 2023/0125913 A1* | 4/2023 | Jeon | H04W 24/04 370/217 |
| 2023/0300761 A1* | 9/2023 | Liu | H04W 56/001 370/503 |
| 2023/0336295 A1* | 10/2023 | Sung | H04L 5/0048 |
| 2023/0361955 A1* | 11/2023 | Ganesan | H04B 7/06966 |
| 2024/0088954 A1* | 3/2024 | Athley | H04B 7/0621 |
| 2024/0146485 A1* | 5/2024 | Awada | H04W 36/0058 |
| 2025/0016633 A1* | 1/2025 | Palle Venkata | H04W 76/30 |
| 2025/0048479 A1* | 2/2025 | Lins de Medeiros | H04W 24/04 |

OTHER PUBLICATIONS

3GPP TS 38.214, 3rd Generation Partnership Project, Technical Specification Group Radio Access Network, NR, Physical layer procedures for data (Release 17), Sep. 2022.

O-RAN Alliance Working Group 4 (Open Fronthaul Interfaces WG) Control, User and Synchronization Plane Specification, v9.00, Mar. 11, 2019.

O-RAN Alliance Working Group 4 (Open Fronthaul Interfaces WG) Management Plane Specification, v10.00, Aug. 15, 2022.

International Search Report and Written Opinion for International Patent Application No. PCT/US2022/082352 mailed Apr. 3, 2023.

* cited by examiner

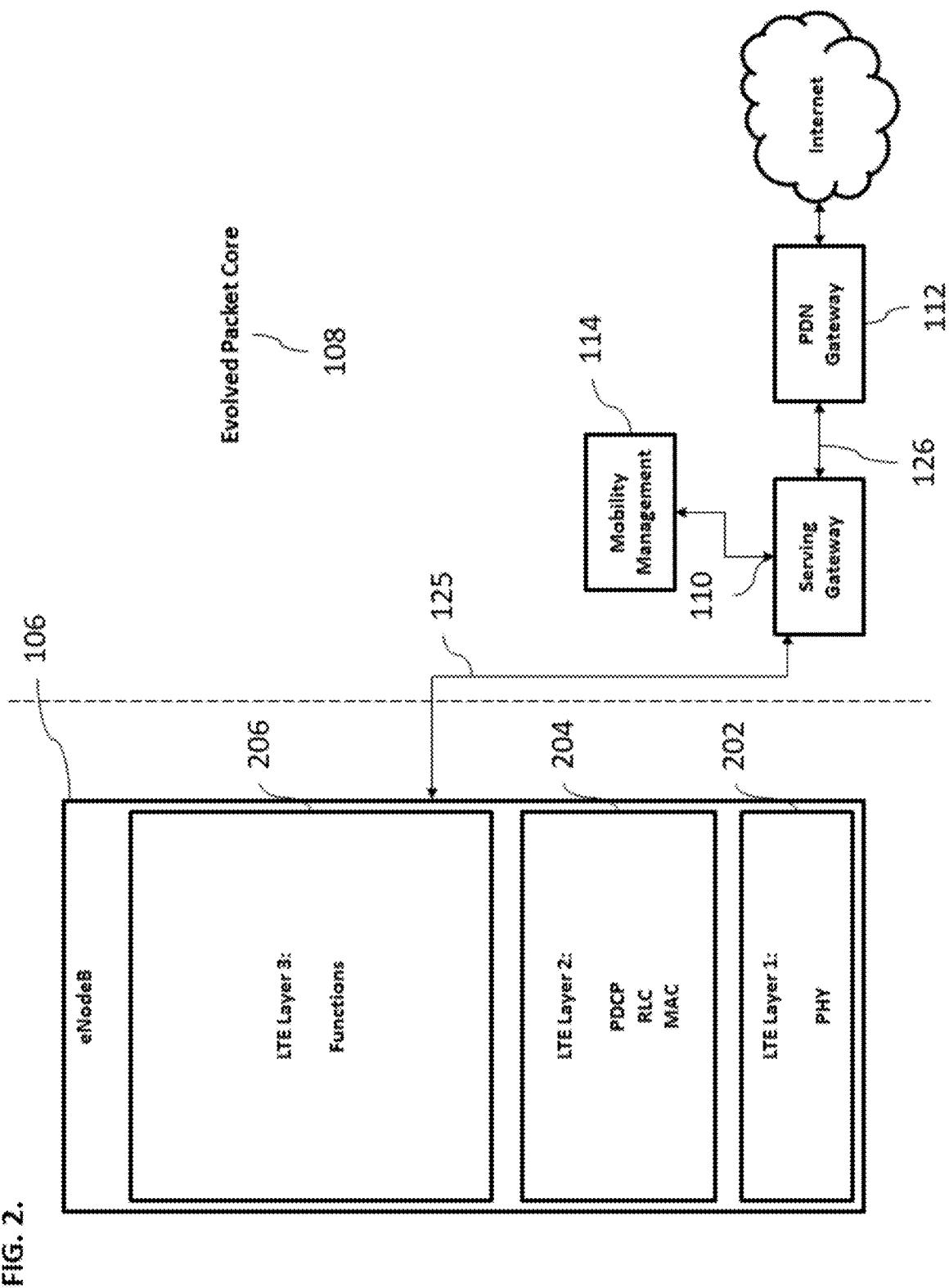

FIG. 7.

| # | extType=xx##h | L | |
|---|---|---|---|
| | extLen | x | Octet N |
| | Rsrvr TSg8xxx Table 7.4.1.5.3-1 | x | Octet N+1 |
| | Perh TSg8xxx Table 7.4.1.5.3-1 | var | Octet N+2 |
| | Chrrmy TSg8xxx Table 7.4.1.5.3-1 | var | Octet N+3 |
| | (k, l) TSg8xxx Table 7.4.1.5.3-1 | var | Octet N+4 |
| | cdm group index TSg8xxx Table 7.4.1.5.3-1 | var | Octet N+5 |
| | k TSg8xxx Table 7.4.1.5.3-1 | var | Octet N+6 |
| | l TSg8xxx Table 7.4.1.5.3-1 | var | Octet N+7 |
| | csi-rs-bandwidth | var | Octet N+8 |
| | StartingNumerator | var | Octet N+9 |
| | ScramblingId | var | Octet N+22 |

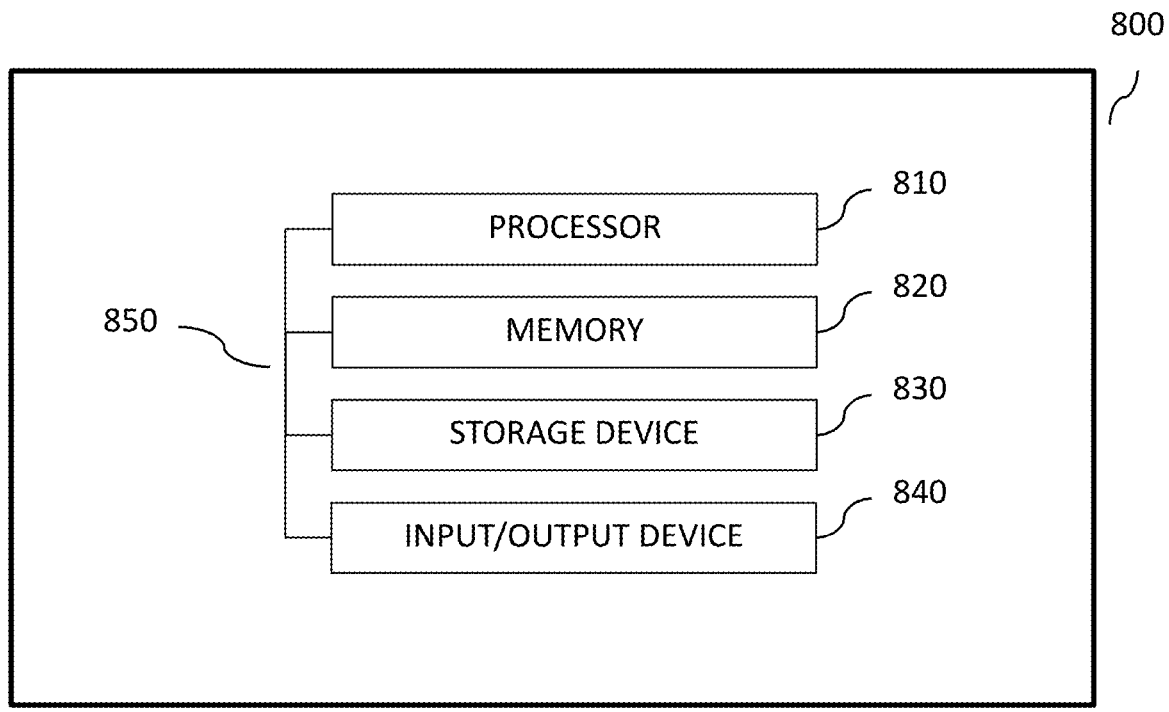

FIG. 9.

902 — receiving, at a radio unit (RU) of a base station in a wireless communication system, a message including channel state information reference signal (CSI RS) configuration information that the RU is configured to use in generating a CSI RS for transmission to a user equipment (UE); wherein the CSI RS configuration information includes a plurality of parameters comprising a bandwidth for CSI RS transmission, amplitude scaling, and a scrambling identity (ID)

TRANSMISSION OF CHANNEL STATE INFORMATION REFERENCE SIGNALS

CROSS-REFERENCE TO RELATED APPLICATIONS

The present application claims priority to and is the 35 U.S.C. § 371 United States National Phase application based on International Patent Application No. PCT/US22/82352, filed Dec. 23, 2022, and entitled "Transmission of Channel State Information Reference Signals," which claims priority to Indian Patent Application number 202241063907 to Raghavendra Ramakrishna et al., filed Nov. 9, 2022, and entitled "Transmission of Channel State Information Reference Signals", and incorporates their disclosures herein by reference in their entireties.

TECHNICAL FIELD

In some implementations, the current subject matter relates to telecommunications systems, and in particular, to transmission of channel state information reference signals (CSI RSs).

BACKGROUND

In today's world, cellular networks provide on-demand communications capabilities to individuals and business entities. Typically, a cellular network is a wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide improved service within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if the mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. A 5G standard is currently being developed and deployed. 3GPP cellular technologies like LTE and 5G NR are evolutions of earlier generation 3GPP technologies like the GSM/EDGE and UMTS/HSPA digital cellular technologies and allows for increasing capacity and speed by using a different radio interface together with core network improvements.

Cellular networks can be divided into radio access networks and core networks. The radio access network (RAN) can include network functions that can handle radio layer communications processing. The core network can include network functions that can handle higher layer communications, e.g., internet protocol (IP), transport layer and applications layer. In some cases, the RAN functions can be split into baseband unit functions and the radio unit functions, where a radio unit connected to a baseband unit via a fronthaul network, for example, can be responsible for lower layer processing of a radio physical layer while a baseband unit can be responsible for the higher layer radio protocols, e.g., MAC, RLC, etc.

Various data can be transmitted on the fronthaul network. However, the fronthaul network has a limited amount of bandwidth. If data traffic becomes too high on the fronthaul network, data packets can be dropped, thus adversely affecting service on the cellular network.

SUMMARY

In some implementations, the current subject matter relates to a computer-implemented method. The method can include receiving, at a radio unit (RU) of a base station in a wireless communication system, a message including channel state information reference signal (CSI RS) configuration information that the RU is configured to use in generating a CSI RS for transmission to a user equipment (UE). The CSI RS configuration information can include a plurality of parameters including a bandwidth for CSI RS transmission, amplitude scaling, and a scrambling identity (ID).

The method may allow the RU to receive the parameters that the RU needs to generate the CSI RS and map the CSI RS to resource elements (RE). Thus, for multiport CSI transmission in which multiple CSI RS ports are used for signal transmission, CSI RSs may be generated by the RU with less traffic on a fronthaul network between the RU and a distributed unit (DU) of the base station than is traditionally required for multiport CSI RS transmission. Data packets may therefore be less likely to be dropped on the fronthaul network due to bandwidth issues.

In some implementations, the current subject matter can include one or more of the following optional features.

In some implementations, the message can be a control plane (C-plane) message. Further, the message can be of a section type or a section extension type that defines the plurality of parameters included in the CSI RS configuration information; and/or the message can be transmitted to the RU from a DU of the base station, and the message can provide real time C-plane control to the RU.

In some implementations, the message can be a management plane (M-plane) message. Further, the RU can indicate support of the CSI RS configuration information in a feature in a yang model.

In some implementations, the plurality of parameters can also include ports, density, code division multiplexing type, orthogonal frequency-division multiplexing (OFDM) symbol number within a slot, slot number within a radio frame, and number of OFDM symbols per slot.

In some implementations, the plurality of parameters can include all the parameters needed for the RU to generate the CSI RS for transmission to the UE.

In some implementations, the CSI RS can be generated at the RU using the CSI RS configuration information, and the generated CSI RS can be transmitted from the RU to the UE. Further, after the transmission of the generated CSI RS, CSI can be received at the RU from the UE, and the RU can transmit the CSI to the DU for decoding.

In some implementations, the wireless communication system can be an LTE communication system or a 5G communication system.

In some implementations, the base station can be an eNodeB or a gNodeB.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary evolved Node B of the exemplary LTE system shown in FIG. 1a;

FIG. 2 illustrates further detail of an evolved Node B shown in FIGS. 1a-d;

FIG. 7 illustrates an exemplary C-plane frame format, according to some implementations of the current subject matter;

FIG. 8 illustrates an exemplary system, according to some implementations of the current subject matter; and FIG. 9 illustrates another exemplary method, according to some implementations of the current subject matter.

DETAILED DESCRIPTION

Figure 1A:
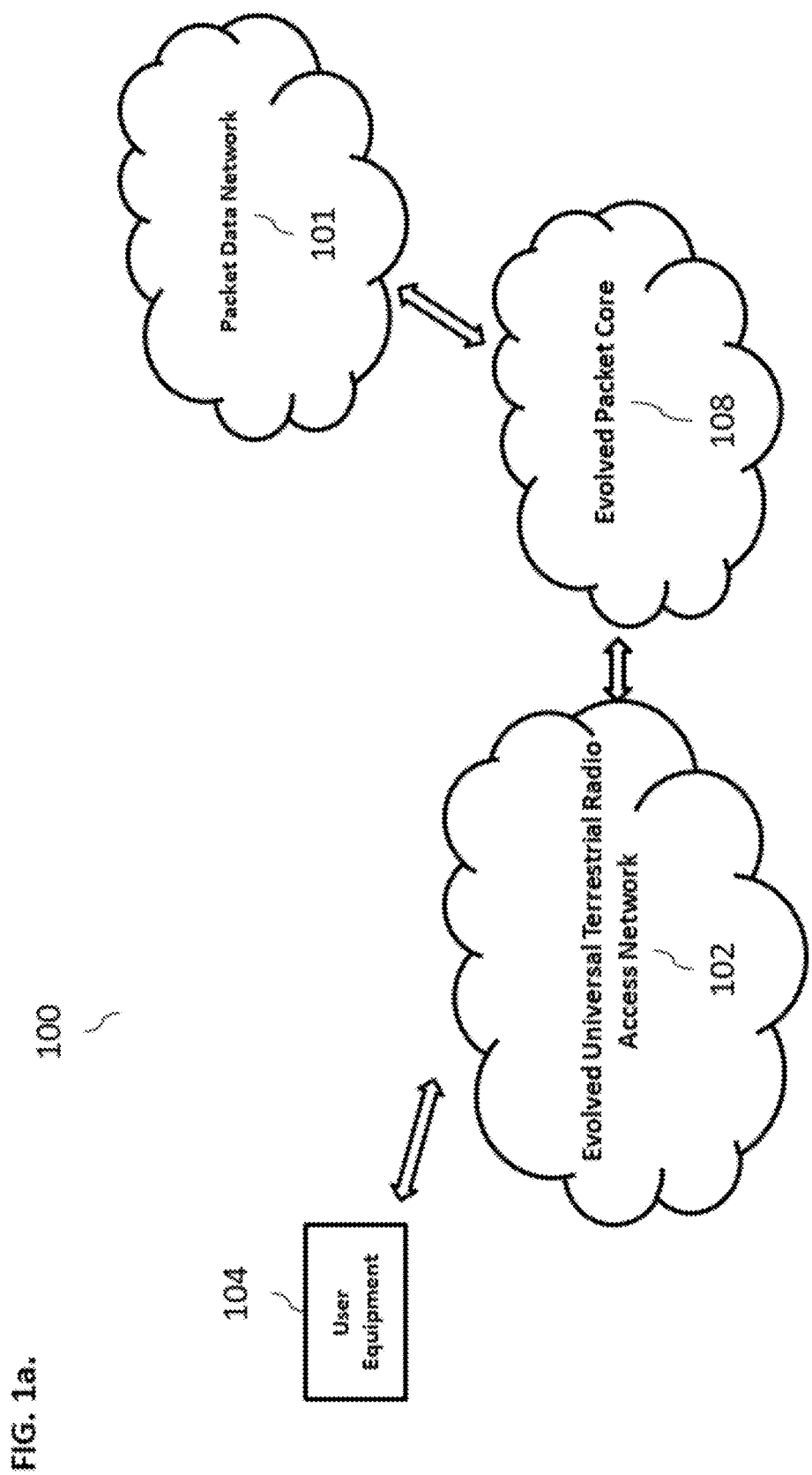
FIG. 1a illustrates an exemplary conventional long term evolution ("LTE") communications system.

The current subject matter can provide for systems and methods that can be implemented in wireless communications systems. Such systems can include various wireless communications systems, including 5G New Radio communications systems, long term evolution communication systems, etc.

In general, the current subject matter relates to transmission of channel state information reference signals (CSI RSs).

In some implementations of the current subject matter, a radio unit (RU) of a base station in a wireless communication system can be configured to generate a CSI RS using configuration information provided to the RU. The configuration information can include all the parameters that the RU needs to generate the CSI RS and map the CSI RS to resource elements (RE). Thus, for multiport CSI transmission in which multiple CSI RS ports are used for signal transmission, CSI RSs may be generated by the RU with less traffic on a fronthaul network between the RU and a distributed unit (DU) of the base station than is traditionally required for multiport CSI RS transmission. Data packets may therefore be less likely to be dropped on the fronthaul network due to bandwidth issues. Traditionally, CSI RS signals can generate instantaneous peak traffic that can throttle a bandwidth limit of the fronthaul network since each port of CSI RS is transmitted with a control plane (C-plane) and user plane (U-plane) data packet and for full bandwidth.

The RU can also be configured to transmit the generated CSI RS to a user equipment (UE) and, in reply, receive CSI from the UE. In general, the CSI, in accordance with the 3GPP standard, measures quality of the downlink channel between the UE and the base station and includes parameters of, e.g., Channel Quality Indicator (CQI), Precoding Type Indicator (PTI), Precoding Matrix Indicator (PMI), Rank Indicator (RI), and Layer Indicator (LI). The base station can use the CSI received from the UE in various ways, in accordance with the 3GPP standard, such as in scheduling and resource allocation, to improve service to the UE.

3GPP standards defining one or more aspects that may be related to the current subject matter include 3GPP TS 38.211

"NR; Physical channels and modulation" and 3GPP TS 38.214 "NR; Physical layer procedures for data." Standards of the O-RAN Alliance may also be related to one or more aspects of the current subject matter, such as the "Control, User and Synchronization Plane Specification" of O-RAN Working Group 4 and the "Management Plane Specification" of O-RAN Working Group 4.

One or more aspects of the current subject matter can be incorporated into transmitter and/or receiver components of base stations (e.g., gNodeBs, eNodeBs, etc.) in such communications systems. The following is a general discussion of long-term evolution communications systems and 5G New Radio communication systems.

I. Long Term Evolution Communications System

FIGS. 1a-c and 2 illustrate an exemplary conventional long-term evolution ("LTE") communication system 100 along with its various components. An LTE system or a 4G LTE, as it is commercially known, is governed by a standard for wireless communication of high-speed data for mobile telephones and data terminals. The standard is an evolution of the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard was developed by the 3GPP ("3rd Generation Partnership Project").

Figure 1B:
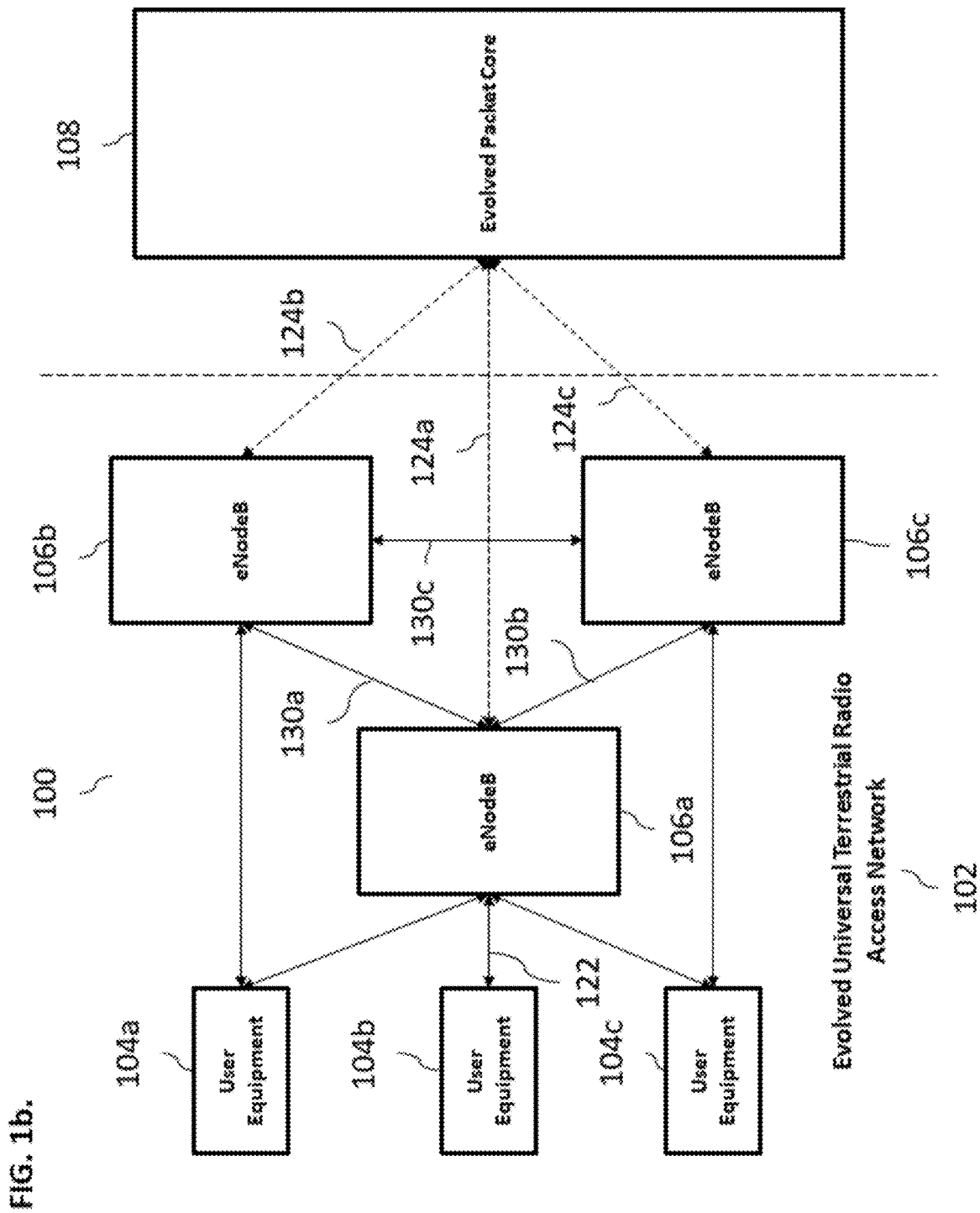

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (a, b, c) (as shown in FIG. 1b) that provide communication capabilities to a plurality of user equipment 104(a, b, c). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
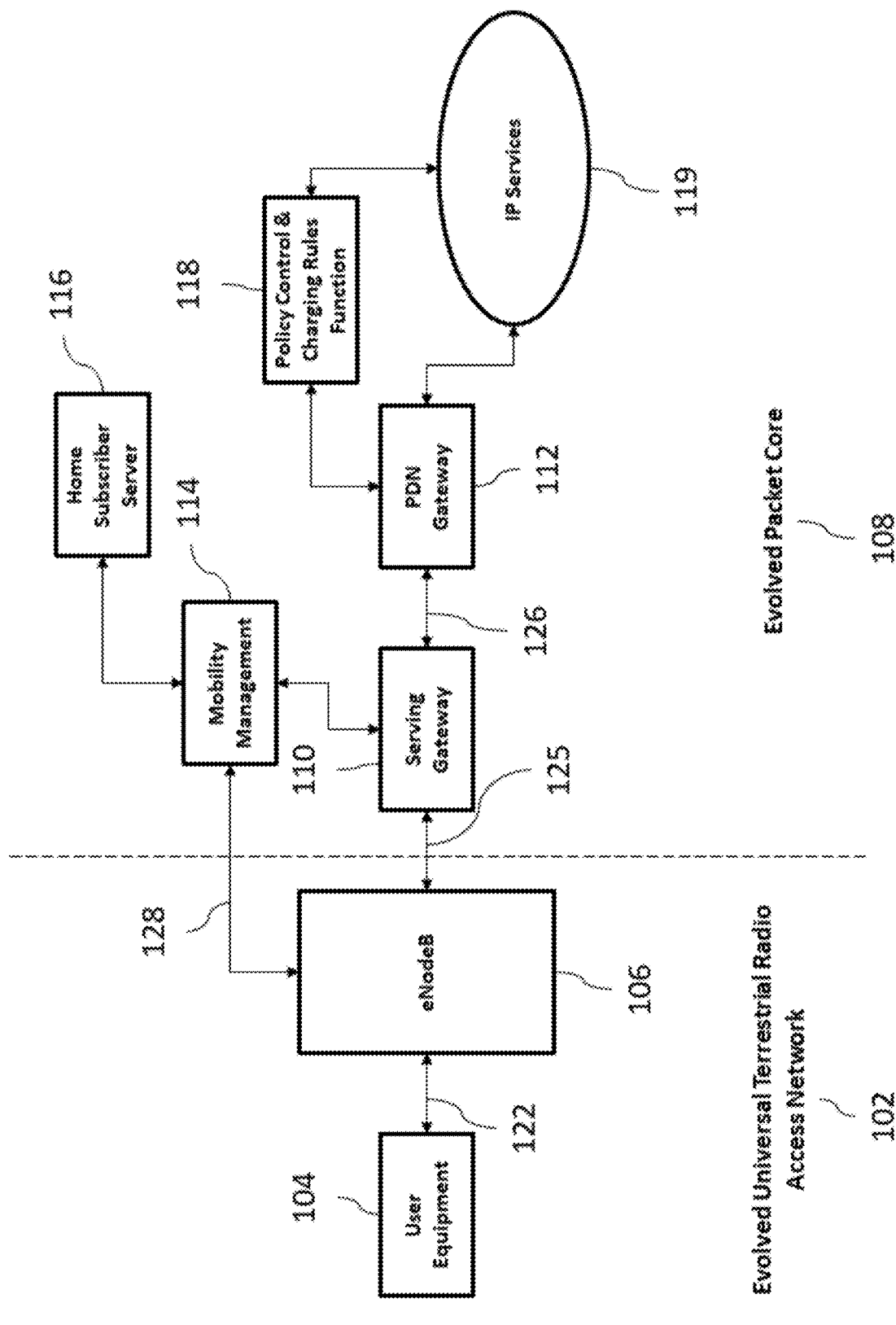

FIG. 1b illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMEs, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1b, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 1b, X2 interface 130a provides interconnection between eNodeB 106a and eNodeB 106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1c) and the other for the user plane (shown as user plane interface (S1-U interface) 125 in FIG. 1c).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1c. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1a). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QOS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1a).

Figure 1D:
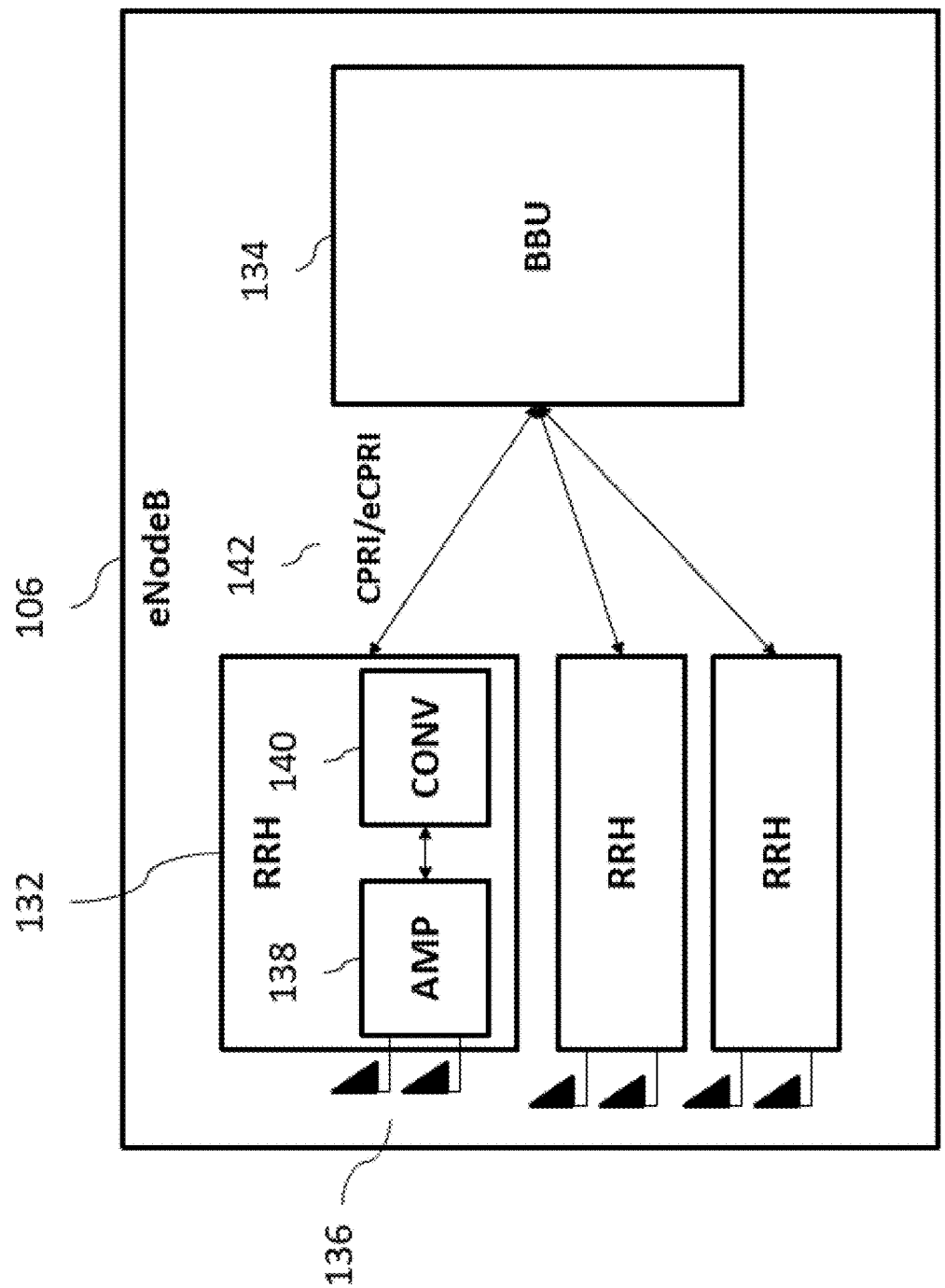

FIG. 1d illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI")/enhanced CPRI ("eCPRI") 142 standard specification either using RRH specific custom control and user plane framing methods or using O-RAN Alliance compliant Control and User plane framing methods. The operation of the eNodeB 106 can be characterized using the following standard parameters (and specifications): radio frequency band (Band4, Band9, Band17, etc.), bandwidth (5, 10, 15, 20 MHz), access scheme (downlink: OFDMA; uplink: SC-OFDMA), antenna technology (Single user and multi user MIMO; Uplink: Single user and multi user MIMO), number of sectors (6 maximum), maximum transmission rate (downlink: 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1d) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1d). Conversely, the RF signals that are received from user equipment 104 are amplified (using AMP 138) and converted (using CONV 140) to digital baseband signals for transmission to the BBU 134.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1d, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMEs and S-GWs. The eNodeB 106 selects an MME from a group of MMEs so the load can be shared by multiple MMEs to avoid congestion.

II. 5G NR Wireless Communications Networks

In some implementations, the current subject matter relates to a 5G new radio ("NR") communications system. The 5G NR is a next telecommunications standard beyond the 4G/IMT-Advanced standards. 5G networks offer at higher capacity than current 4G, allow higher number of mobile broadband users per area unit, and allow consumption of higher and/or unlimited data quantities in gigabyte per month and user. This can allow users to stream high-definition media many hours per day using mobile devices, even when it is not possible to do so with Wi-Fi networks. 5G networks have an improved support of device-to-device communication, lower cost, lower latency than 4G equipment and lower battery consumption, etc. Such networks have data rates of tens of megabits per second for a large number of users, data rates of 100 Mb/s for metropolitan areas, 1 Gb/s simultaneously to users within a confined area (e.g., office floor), a large number of simultaneous connections for wireless sensor networks, an enhanced spectral efficiency, improved coverage, enhanced signaling efficiency, 1-10 ms latency, reduced latency compared to existing systems.

Figure 3:
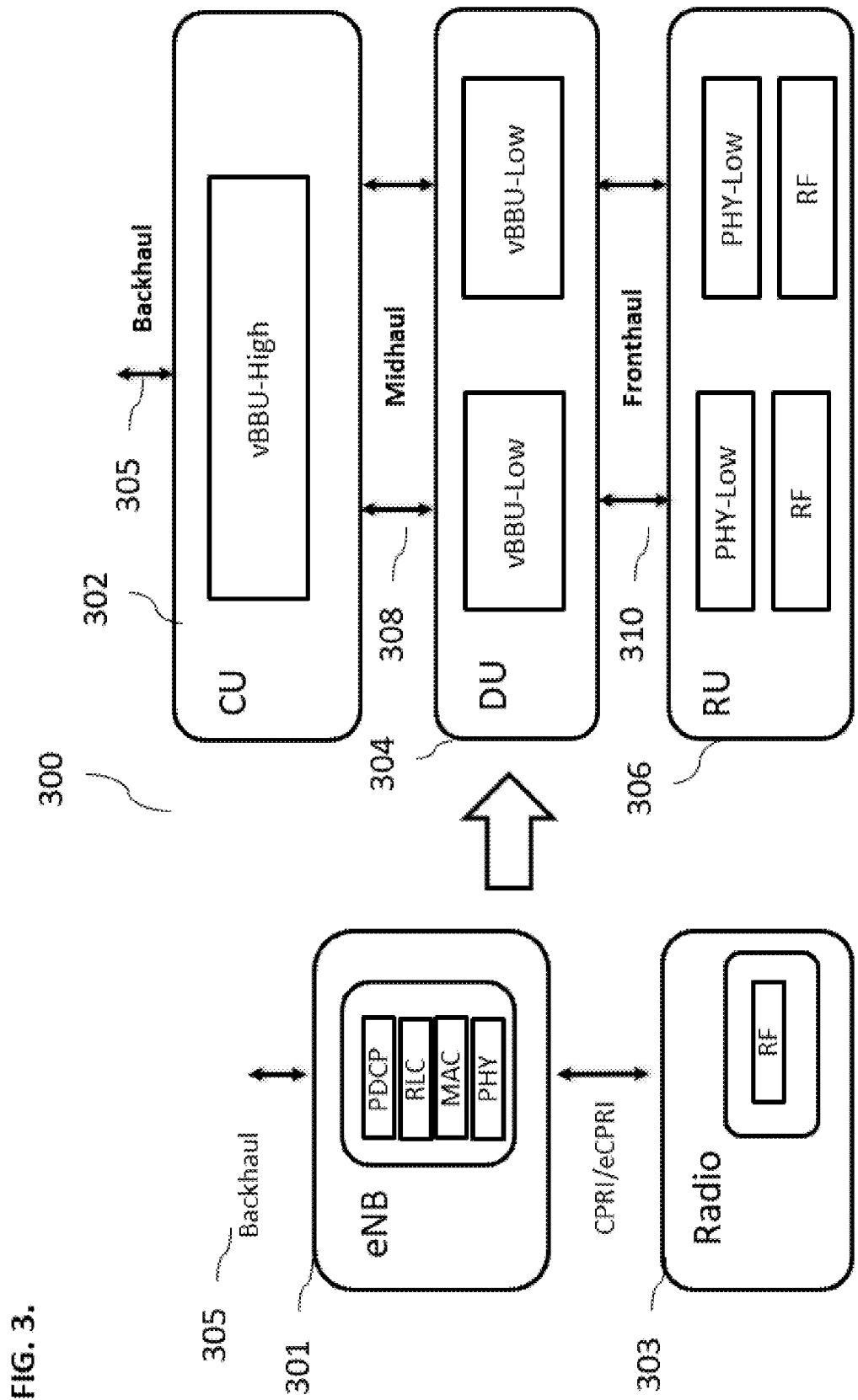
FIG. 3 illustrates an exemplary virtual radio access network, according to some implementations of the current subject matter.

FIG. 3 illustrates an exemplary virtual radio access network 300. The network 300 can provide communications between various components, including a base station (e.g., eNodeB, gNodeB) 301, a radio equipment 303, a centralized unit 302, a digital unit 304, and a radio device 306. The components in the system 300 can be communicatively coupled to a core using a backhaul link 305. A centralized unit ("CU") 302 can be communicatively coupled to a distributed unit ("DU") 304 using a midhaul connection 308. The radio frequency ("RU") components 306 can be communicatively coupled to the DU 304 using a fronthaul connection 310.

In some implementations, the CU 302 can provide intelligent communication capabilities to one or more DU units 304. The units 302, 304 can include one or more base stations, macro base stations, micro base stations, remote radio heads, etc. and/or any combination thereof.

In lower layer split architecture environment, a CPRI bandwidth requirement for NR can be 100 s of Gb/s. CPRI compression can be implemented in the DU and RU (as shown in FIG. 3). In 5G communications systems, compressed CPRI over Ethernet frame is referred to as eCPRI and is the recommended fronthaul network. The architecture can allow for standardization of fronthaul/midhaul, which can include a higher layer split (e.g., Option 2 or Option 3-1 (Upper/Lower RLC split architecture)) and fronthaul with L1-split architecture (Option 7).

In some implementations, the lower layer-split architecture (e.g., Option 7) can include a receiver in the uplink, joint processing across multiple transmission points (TPs) for both DL/UL, and transport bandwidth and latency requirements for ease of deployment. Further, the current subject matter's lower layer-split architecture can include a split between cell-level and user-level processing, which can include cell-level processing in remote unit ("RU") and user-level processing in DU. Further, using the current subject matter's lower layer-split architecture, frequency-domain samples can be transported via Ethernet fronthaul, where the frequency-domain samples can be compressed for reduced fronthaul bandwidth.

Figure 4:
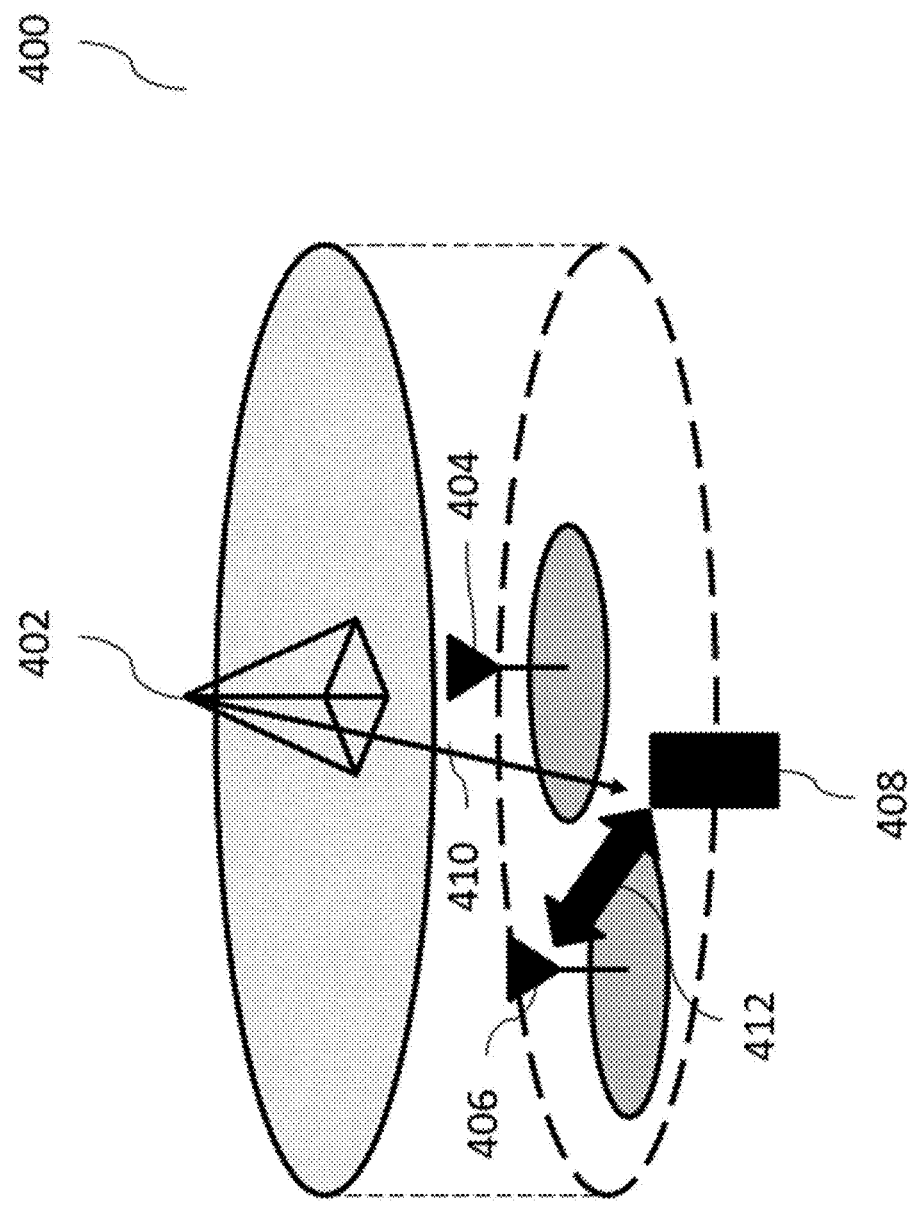
FIG. 4 illustrates an exemplary 3GPP split architecture to provide its users with use of higher frequency bands.

FIG. 4 illustrates an exemplary communications system 400 that can implement a 5G technology and can provide its users with use of higher frequency bands (e.g., greater than 10 GHz). The system 400 can include a macro cell 402 and small cells 404, 406.

A mobile device 408 can be configured to communicate with one or more of the small cells 404, 406. The system 400 can allow splitting of control planes (C-plane) and user planes (U-plane) between the macro cell 402 and small cells 404, 406, where the C-plane and U-plane are utilizing different frequency bands. In particular, the small cells 404, 406 can be configured to utilize higher frequency bands when communicating with the mobile device 408. The macro cell 402 can utilize existing cellular bands for C-plane communications. The mobile device 408 can be communicatively coupled via U-plane 412, where the small cell (e.g., small cell 406) can provide higher data rate and more flexible/cost/energy efficient operations. The macro cell 402, via C-plane 410, can maintain good connectivity and mobility. Further, in some cases, LTE and NR can be transmitted on the same frequency.

Figure 5A:
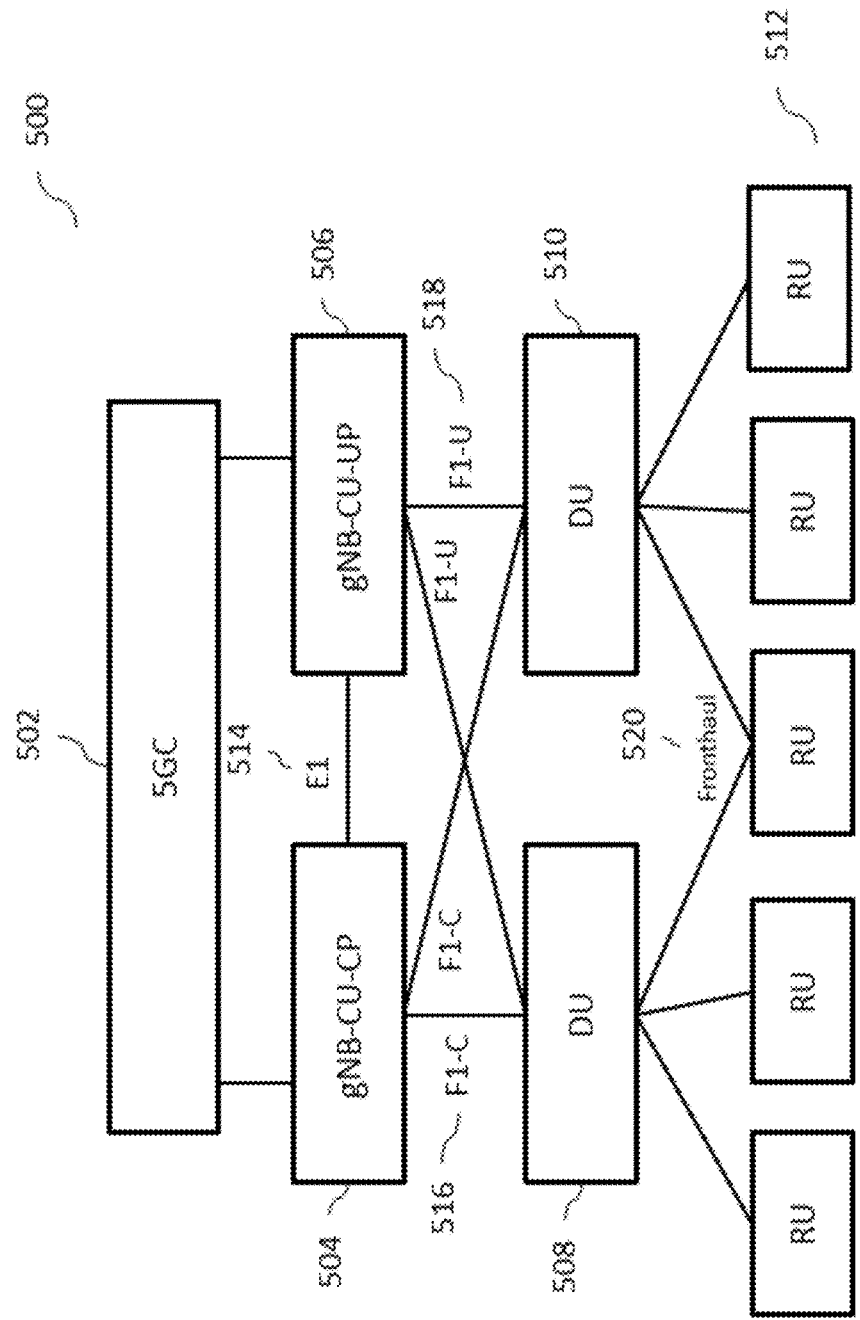
FIG. 5a illustrates an exemplary 5G wireless communication system.

FIG. 5a illustrates an exemplary 5G wireless communication system 500, according to some implementations of the current subject matter. The system 500 can be configured to have a lower layer split architecture in accordance with Option 7-2. The system 500 can include a core network 502 (e.g., 5G Core) and one or more gNodeBs (or gNBs), where the gNBs can have a centralized unit gNB-CU. The gNB-CU can be logically split into control plane portion, gNB-CU-CP, 504 and one or more user plane portions, gNB-CU-UP, 506. The control plane portion 504 and the user plane portion 506 can be configured to be communicatively coupled using an E1 communication interface 514 (as specified in the 3GPP Standard). The control plane portion 504 can be configured to be responsible for execution of the RRC and PDCP protocols of the radio stack.

The control plane and user plane portions 504, 506 of the centralized unit of the gNB can be configured to be communicatively coupled to one or more distributed units (DU) 508, 510, in accordance with the higher layer split architecture. The distributed units 508, 510 can be configured to execute RLC, MAC and upper part of PHY layers protocols of the radio stack. The control plane portion 504 can be configured to be communicatively coupled to the distributed units 508, 510 using F1-C communication interfaces 516, and the user plane portions 506 can be configured to be communicatively coupled to the distributed units 508, 510 using F1-U communication interfaces 518. The distributed units 508, 510 can be coupled to one or more remote radio units (RU) 512 via a fronthaul network 520 (which may include one or switches, links, etc.), which in turn communicate with one or more user equipment (not shown in FIG. 5a). The remote radio units 512 can be configured to execute a lower part of the PHY layer protocols as well as provide antenna capabilities to the remote units for communication with user equipments (similar to the discussion above in connection with FIGS. 1a-2).

Figure 5B:
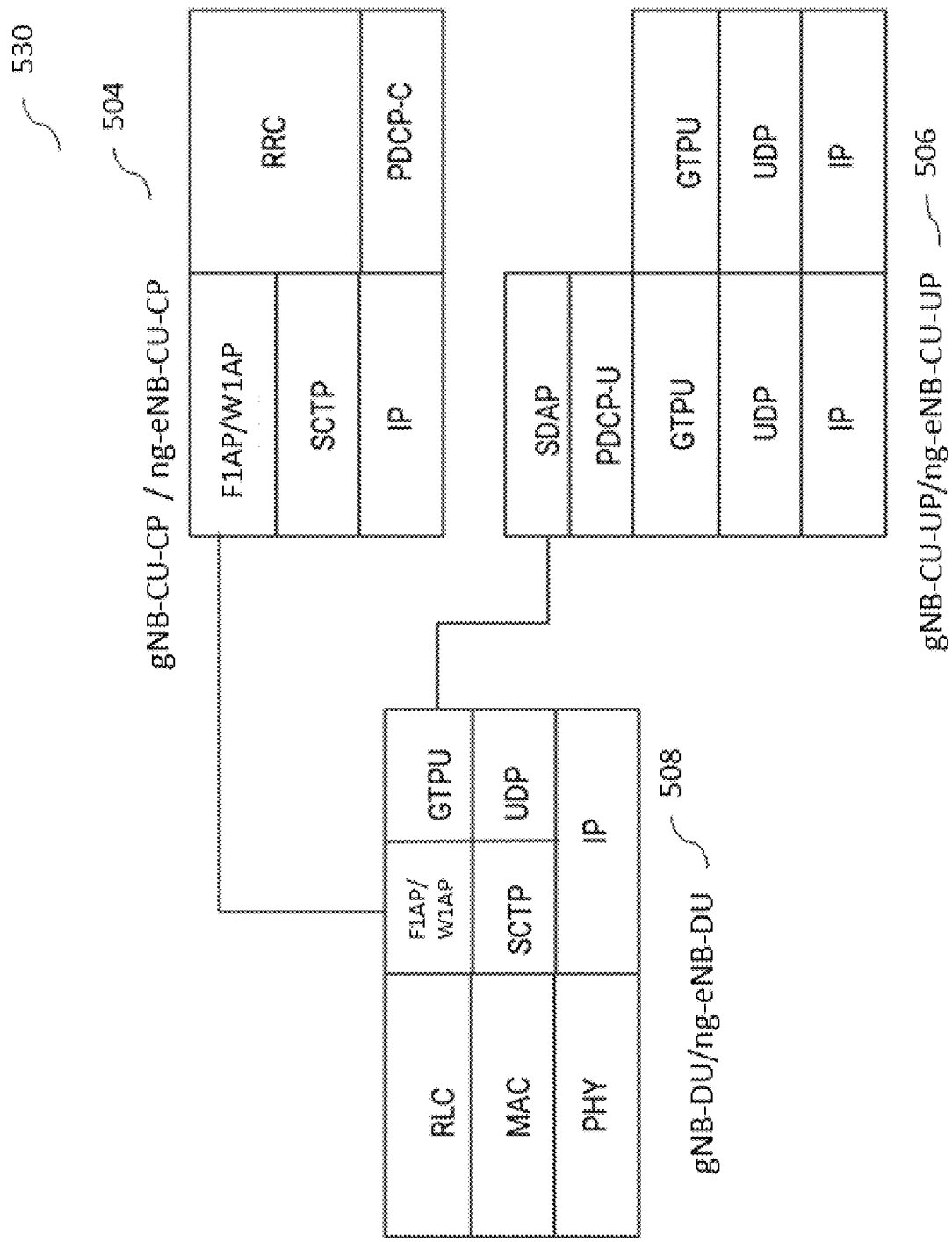
FIG. 5b illustrates an exemplary layer architecture of the split gNB and/or a split ng-eNB (e.g., next generation eNB that may be connected to 5GC)

FIG. 5b illustrates an exemplary layer architecture 530 of the split gNB. The architecture 530 can be implemented in the communications system 500 shown in FIG. 5a, which can be configured as a virtualized disaggregated radio access network (RAN) architecture, whereby layers L1, L2, L3 and radio processing can be virtualized and disaggregated in the centralized unit(s), distributed unit(s) and radio unit(s). As shown in FIG. 5b, the gNB-DU 508 can be communicatively coupled to the gNB-CU-CP control plane portion 504 (also shown in FIG. 5a) and gNB-CU-UP user plane portion 506. Each of components 504, 506, 508 can be configured to include one or more layers.

The gNB-DU 508 can include RLC, MAC, and PHY layers as well as various communications sublayers. These can include an F1 application protocol (F1-AP) sublayer, a GPRS tunneling protocol (GTPU) sublayer, a stream control transmission protocol (SCTP) sublayer, a user datagram protocol (UDP) sublayer and an internet protocol (IP) sublayer. As stated above, the distributed unit 508 may be communicatively coupled to the control plane portion 504 of the centralized unit, which may also include F1-AP, SCTP, and IP sublayers as well as radio resource control, and PDCP-control (PDCP-C) sublayers. Moreover, the distributed unit 508 may also be communicatively coupled to the user plane portion 506 of the centralized unit of the gNB.

The user plane portion 506 may include service data adaptation protocol (SDAP), PDCP-user (PDCP-U), GTPU, UDP, and IP sublayers.

Figure 5C:
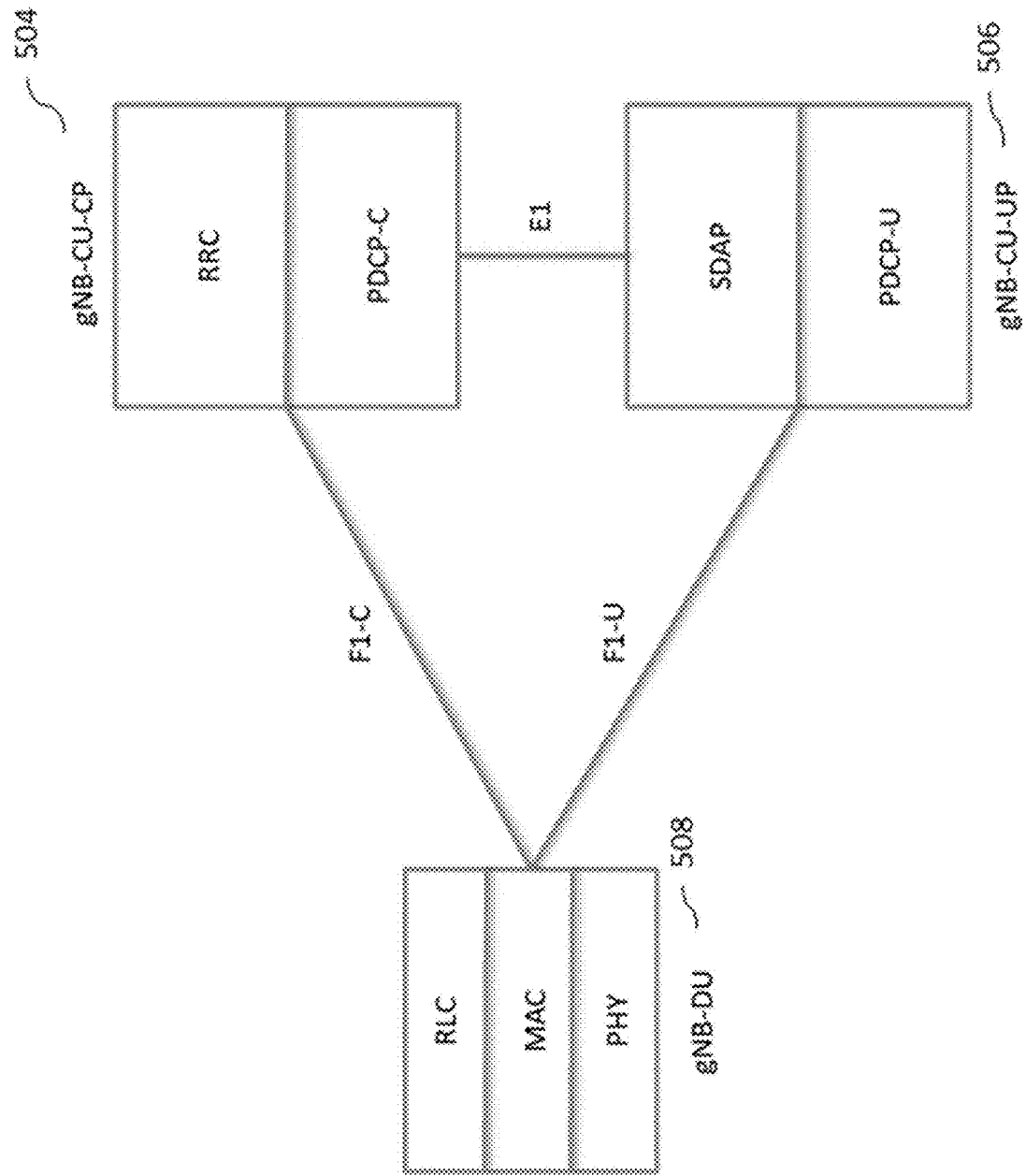
FIG. 5c illustrates an exemplary functional split in the gNB architecture shown in FIGS. 5a-b.

FIG. 5c illustrates an exemplary functional split in the gNB architecture shown in FIGS. 5a-b. As shown in FIG. 5c, the gNB-DU 508 may be communicatively coupled to the gNB-CU-CP 504 and gNB-CU-UP 506 using an F1-C communication interface. The gNB-CU-CP 504 and gNB-CU-UP 506 may be communicatively coupled using an E1 communication interface. The higher part of the PHY layer (or Layer 1) may be executed by the gNB-DU 508, whereas the lower parts of the PHY layer may be executed by the RUs (not shown in FIG. 5c). As shown in FIG. 5c, the RRC and PDCP-C portions may be executed by the control plane portion 504, and the SDAP and PDCP-U portions may be executed by the user plane portion 506.

Some of the functions of the PHY layer in 5G communications network can include error detection on the transport channel and indication to higher layers, FEC encoding/decoding of the transport channel, hybrid ARQ soft-combining, rate matching of the coded transport channel to physical channels, mapping of the coded transport channel onto physical channels, power weighting of physical channels, modulation and demodulation of physical channels, frequency and time synchronization, radio characteristics measurements and indication to higher layers, MIMO antenna processing, digital and analog beamforming, RF processing, as well as other functions.

The MAC sublayer of Layer 2 can perform beam management, random access procedure, mapping between logical channels and transport channels, concatenation of multiple MAC service data units (SDUs) belonging to one logical channel into transport block (TB), multiplexing/demultiplexing of SDUs belonging to logical channels into/from TBs delivered to/from the physical layer on transport channels, scheduling information reporting, error correction through HARQ, priority handling between logical channels of one UE, priority handling between UEs by means of dynamic scheduling, transport format selection, and other functions. The RLC sublayer's functions can include transfer of upper layer packet data units (PDUs), error correction through ARQ, reordering of data PDUs, duplicate and protocol error detection, re-establishment, etc. The PDCP sublayer can be responsible for transfer of user data, various functions during re-establishment procedures, retransmission of SDUs, SDU discard in the uplink, transfer of control plane data, and others.

Layer 3's RRC sublayer can perform broadcasting of system information to NAS and AS, establishment, maintenance and release of RRC connection, security, establishment, configuration, maintenance and release of point-point radio bearers, mobility functions, reporting, and other functions.

III. Transmission of Channel State Information Reference Signals

In some implementations of the current subject matter, an RU (e.g., RU 306 of FIG. 3, RUs 512 of FIG. 5a, etc.) of a base station (e.g., eNodeBs 106 (*a, b, c*) of FIGS. 1b-2, gNodeB of FIG. 5a, etc.) in a wireless communication system (e.g., 5G, 6G or other generation later than 5G, LTE, etc.) can be configured to generate a CSI RS using configuration information provided to the RU. The configuration information can include all the parameters that the RU needs to generate the CSI RS and map the CSI RS to resource elements (RE).

Figure 6:
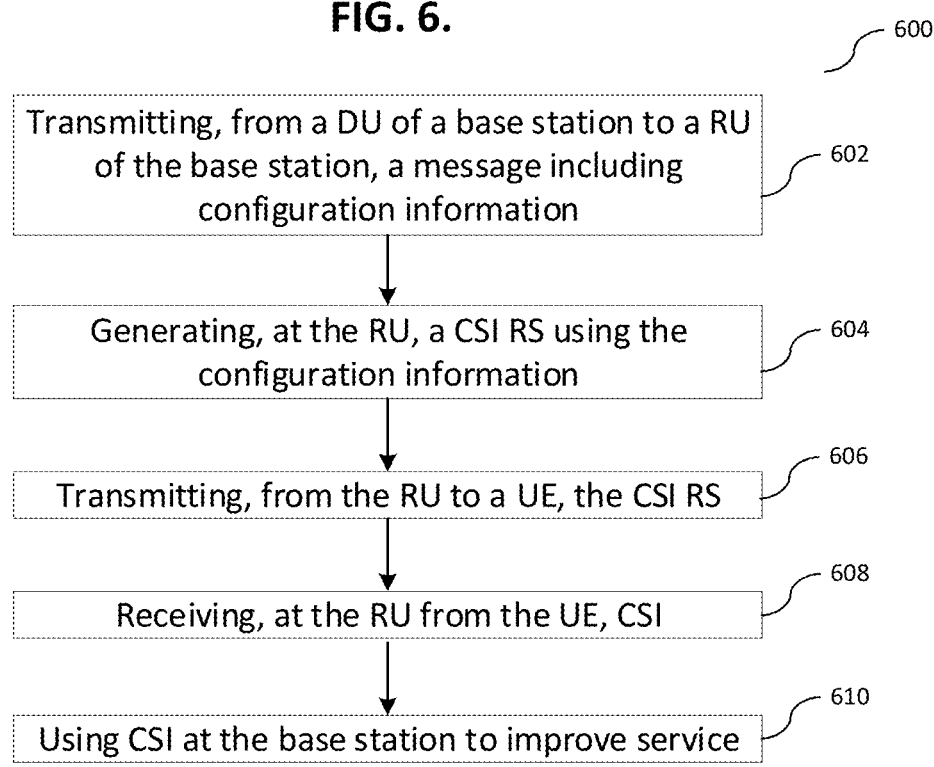
FIG. 6 illustrates an exemplary method, according to some implementations of the current subject matter.

FIG. 6 illustrates an exemplary implementation of a method 600 for transmission of CSI RS, according to some implementations of the current subject matter. The method 600 includes a DU (DU 304 of FIG. 3, DUs 508, 510 of FIGS. 5a-5c, etc.) of a base station (e.g., eNodeBs 106 (*a, b, c*) of FIGS. 1b-2, gNodeB of FIG. 5a, etc.) transmitting 602 a message to an RU (e.g., RU 306 of FIG. 3, RUs 512 of FIG. 5a, etc.) of the base station. The message includes configuration information for CSI RSs.

The configuration information can include parameters that the RU needs to generate 604 a channel state information reference signal and map the CSI RS to resource elements (RE). The parameters can include information defined by the 3GPP standard for CSI RS, e.g., information in Table 7.4.1.5.3-1 ("CSI-RS locations within a slot") of 3GPP TS 38.211 "NR; Physical channels and modulation," including ports, density, code division multiplexing type, orthogonal frequency-division multiplexing (OFDM) symbol number within a slot, slot number within a radio frame, and number of OFDM symbols per slot. The parameters can also include one or more additional parameters including one or more of a bandwidth for CSI RS transmission, amplitude scaling, a scrambling identity (ID), orthogonal frequency-division multiplexing (OFDM) symbol number within a slot, slot number within a radio frame, and number of OFDM symbols per slot. All of the information that the RU needs to generate 604 the CSI RS may thus be included in the configuration information such that traffic on the fronthaul network may be reduced due to less traffic needed for the RU to receive the information it needs to generate the CSI RS.

Table 1 shows types of messages that may be transmitted on a fronthaul communications link between a DU and an RU (e.g., the fronthaul connection 310 between the DU 304 and the RU 306 of FIG. 3, a fronthaul connection on the fronthaul network 520 between the DU 508 and one of the RUs 512 of FIG. 5a, a fronthaul connection on the fronthaul network 520 between the DU 510 and one of the RUs 512 of FIG. 5a, etc.) along with directions of transmission. The messages can be transmitted in a control plane (C-plane), a user plane (U-plane), a synchronization plane (S-plane), and a management plane (M-plane). The C-plane can include uplink and downlink messages (both DU to RU). The U-plane can also include uplink (RU to DU) and downlink (DU to RU) messages, where IQ samples can be transmitted to/from user equipment. The uplink/downlink directions are not applicable to the transmission of messages in the synchronization and management planes. The S-plane includes messages carrying timing information as related to a timing grandmaster. The M-plane carries messages related to configuration (DU to RU) and notifications/measurements (RU to DU).

TABLE 1

| Control Plane (C-Plane) | To instruct the RU slot by slot which physical resource blocks carry the user plane IQ samples information. For massive MIMO RU, the C-plane | Uplink Downlink | DU to RU DU to RU |

TABLE 1-continued

| | messages also carry beamforming weights. | | |
|---|---|---|---|
| User Plane (U-Plane) | IQ samples from/to UE | Uplink Downlink | RU to DU DU to RU |
| Synchronization Plane (S-Plane) | To distribute timing and frequency | Uplink/downlink not applicable | Timing Grandmaster Switch to DU and RU DU to RU |
| Management Plane (M-Plane) | To manage the configuration, alarms and statistics of RU | Uplink/downlink not applicable | DU to RU for configuration RU to DU for alarm notifications and performance measurements |

As mentioned above, lower layer split (LLS) architecture can include a split between cell-level and user-level processing, which can include cell-level processing in the RU and user-level processing in the DU. In an O-RAN architecture, the LLS Control-plane (LLS-C) logical interface between the RU (O-RU) and the DU (O-DU) can be used for C-plane communications between the RU (O-RU) and the DU (O-DU).

The O-RAN Working Group 4 (Open Fronthaul Interfaces WG), "Control, User and Synchronization Plane Specification" specifies the C-plane, U-plane, and S-plane protocols used over a fronthaul connection for a DU (O-DU) and an RU (O-RU) with an LLS architecture. The O-RAN Working Group 4 (Open Fronthaul Interfaces WG), "Management Plane Specification" specifies the specifies the M-plane protocol used over a fronthaul connection for a DU (O-DU) and an RU (O-RU) with an LLS architecture.

In some implementations of the current subject matter, the configuration information can be transmitted 602 to the RU in a C-plane message from the DU that is transmitted in the C-plane to the RU from the DU. The C-plane message can be of a section type (or section extension type) that defines the parameters included in the CSI RS configuration information. As mentioned above, the parameters can include information defined by the 3GPP standard for CSI RS, e.g., information in Table 7.4.1.5.3-1 ("CSI-RS locations within a slot") of 3GPP TS 38.211 "NR; Physical channels and modulation," in addition to a one or more additional parameters. All of the information that the RU needs to generate the CSI RS may thus be included in the configuration information such that traffic on the fronthaul network may be reduced due to less C-plane traffic needed for the RU to receive the information it needs to generate the CSI RS. The C-plane message may also thus carry the beamforming weights for each of the CSI-RS ports.

The "Control, User and Synchronization Plane Specification" of O-RAN Working Group 4 defines a common frame format for C-plane messages where parameters in the frame are specific to the section type being used. Some section types (e.g., 0-7) are defined while other section types (e.g., 8-255) are reserved for future use. The section type for the C-plane message including configuration information as described herein is not a currently defined section type but can be provided as a defined section type, e.g., as one of the section types currently reserved for future use. Configuration information may thus be shared in a standard way in RAN.

In general, as defined by the O-RAN Alliance, a common frame format shall be used for C-plane messages. C-plane messages have a first layer, which includes an eCPRI common header or IEEE 1914.3 common header, and a second layer, which includes an application layer including necessary fields for control and synchronization. A "section" within the application layer defines characteristics of U-plane data to be transferred or received from a beam with one pattern id. Within a data description section, the section header can include an "extension flag" indicating parameters that apply to the section beyond those within the section header.

FIG. 7 illustrates an exemplary implementation of a C-plane frame format 700 for a section type for transmission 602 of CSI RS configuration information in a C-plane message. The C-plane message can thus be of a section type that defines the plurality of parameters included in the CSI RS configuration information.

As shown in FIG. 7, the C-plane frame format 700 includes an extension flag (ef). Within the extension flag is another extension flag, a type field (extType), which is a 7-bit field describing the section extension type, and a length field (extLen), which details how many 4-byte words are in the extension.

As also shown in FIG. 7, the parameters in the extension include a plurality of parameters defined by 3GPP (e.g., Table 7.4.1.5.3-1 ("CSI-RS locations within a slot") of 3GPP TS 38.211 "NR; Physical channels and modulation"): row, port, density, (k,l) (location of resource element, where "k" is the index in the frequency domain and "l" refers to the symbol position in the time domain relative to some reference point), CDM group index, k (subcarrier offset), and l (OFDM symbol number within a slot). The parameters in the extension also include a plurality of additional parameters: csi-rs-bandwidth (a bandwidth for CSI RS transmission), amplitude scaling ($\beta_{CSIRS}$), and a scrambling identity (ID). The parameters csi-rs-bandwidth, amplitude scaling, and scrambling ID are used for the UE to decode the CSi-RS data transmitted to the UE from the base station.

Referring again to FIG. 6, in some implementations of the current subject matter, the configuration information can be transmitted 602 to the RU in an M-plane message from the DU. The RU can be configured to indicate support of the CSI RS configuration information in a feature in a yang model, such as o-ran-module-cap.yang module, e.g., the RU can be configured to advertise its support of the CSI RS configuration information in a feature of a yang model. The M-plane message may thus carry the beamforming weights for each of the CSI-RS ports.

The NETCONF/YANG protocol (or application layer mode of communication) can be used for operations and/or management of network functions. The NETCONF/YANG is a network management protocol developed and standardized by the Internet Engineering Task Force (IETF) under RFC 4741 and RFC 6241 standards. The NETCONF/YANG protocol provides mechanisms to install, manipulate, and delete configuration of network devices.

The "Management Plane Specification" of O-RAN Working Group 4 provides that a NETCONF/YANG based M-plane is used for supporting management features. Thus, an O-RAN Alliance compliant yang model may be used in connection with providing CSI RS configuration information to the RU.

An exemplary implementation of a yang model in for use in connection with providing CSI RS configuration information to the RU is shown below:

```
+--rw semi-static-csi-rs-configuration?        -> /user-plane-configuration/semi-static-
csi-rs-configurations/semi-static-csi-rs-config-id {mcap:CSI-RS-SEMI-STATIC-
CONFIGURATION-SUPPORTED}?
+--rw static-csi-rs-configurations* [static-csi-rs-config-id] {mcap:CSI-RS-SEMI-STATIC-
CONFIGURATION-SUPPORTED}?
   | +--Row-TS38211-Table 7.4.1.5.3-1              uint16
   | +--Port-TS38211-Table 7.4.1.5.3-1             uint16
   | +--Density-TS38211-Table 7.4.1.5.3-1          uint16
   | +-- (k,l)-TS38211-Table 7.4.1.5.3-1           uint16
   | +-- cdm group index-TS38211-Table 7.4.1.5.3-1 uint16
   | +-- k-TS38211-Table 7.4.1.5.3-1               uint16
   | +-- csi-rs-bandwidth                          uint16
   | +-- Scaling(beta-csirs)                       uint16
   | +-- Scrambling id                             uint16
```

In this yang model, the RU exposes its ability to support semi-static CSI-RS configuration by support of the feature CSI-RS-SEMI-STATIC-CONFIGURATION-SUPPORTED in o-ran-module-cap.yang module. Presence of this feature means that at least one of static-low-level-rx-endpoints offered by the RU supports semi-static configuration for raw CSI-RS reception. If parameters related to semi-static CSI-RS configuration are set by a NETCONF client, real-time C-Plane control for CSI-RS shall not be provided to the RU, e.g., as described above with respect to a C-plane message including CSI RS configuration information, thereby allowing for static configuration to be utilized instead.

Regardless of how the message including CSI RS configuration information is transmitted 602 to the RU, the RU can generate 604 a CSI RS using the received configuration information. The generation 604 of the CSI RS can be in accordance with 3GPP standards, for example 3GPP TS 38.211 "NR; Physical channels and modulation." The RU can then transmit 606 the CSI RS to a UE. The UE receives the CSI RS and, in response, transmits CSI, e.g., a CSI report, to the RU, which receives 608 the CSI. The UE can create and transmit the CSI report in accordance with 3GPP standards, for example 3GPP TS 38.214 "NR; Physical layer procedures for data." The CSI received at the base station, e.g., received 608 at the RU, can then be used 610 by the base station, in accordance with 3GPP standards, to improve service to the UE.

In some implementations, the current subject matter can be configured to be implemented in a system 800, as shown in FIG. 8. The system 800 can include one or more of a processor 810, a memory 820, a storage device 830, and an input/output device 840. Each of the components 810, 820, 830 and 840 can be interconnected using a system bus 850. The processor 810 can be configured to process instructions for execution within the system 600. In some implementations, the processor 810 can be a single-threaded processor. In alternate implementations, the processor 810 can be a multi-threaded processor. The processor 810 can be further configured to process instructions stored in the memory 820 or on the storage device 830, including receiving or sending information through the input/output device 840. The memory 820 can store information within the system 800. In some implementations, the memory 820 can be a computer-readable medium. In alternate implementations, the memory 820 can be a volatile memory unit. In yet some implementations, the memory 820 can be a non-volatile memory unit. The storage device 830 can be capable of providing mass storage for the system 800. In some implementations, the storage device 830 can be a computer-readable medium. In alternate implementations, the storage device 830 can be a floppy disk device, a hard disk device, an optical disk device, a tape device, non-volatile solid state memory, or any other type of storage device. The input/output device 840 can be configured to provide input/output operations for the system 800. In some implementations, the input/output device 840 can include a keyboard and/or pointing device. In alternate implementations, the input/output device 840 can include a display unit for displaying graphical user interfaces.

FIG. 9 illustrates an exemplary method 900 for transmission of channel state information reference signals, according to some implementations of the current subject matter. The method 900 may be performed, for example, using implementations shown in and described with respect to FIGS. 6 and 7.

The method 900 includes receiving 902, at an RU (e.g., RU 306 of FIG. 3, RUs 512 of FIG. 5a, etc.) of a base station (e.g., eNodeBs 106 (a, b, c) of FIGS. 1b-2, gNodeB of FIG. 5a, etc.) in a wireless communication system (e.g., 5G, 6G or other generation later than 5G, LTE, etc.), a message including channel state information reference signal (CSI RS) configuration information that the RU is configured to use in generating a CSI RS for transmission to a user equipment (UE). The CSI RS configuration information includes a plurality of parameters including a bandwidth for CSI RS transmission, amplitude scaling, and a scrambling identity (ID).

In some implementations, the current subject matter can include one or more of the following optional features.

In some implementations, the message can be a control plane (C-plane) message. Further, the message can be of a section type or a section extension type that defines the plurality of parameters included in the CSI RS configuration information; and/or the message can be transmitted to the RU from a DU (DU 304 of FIG. 3, DUs 508, 510 of FIGS. 5a-5c, etc.) of the base station, and the message can provide real time C-plane control to the RU.

In some implementations, the message can be a management plane (M-plane) message. Further, the RU can indicate support of the CSI RS configuration information in a feature in a yang model (e.g., o-ran-module-cap.yang module).

In some implementations, the plurality of parameters can also include ports, density, code division multiplexing type, orthogonal frequency-division multiplexing (OFDM) symbol number within a slot, slot number within a radio frame, and number of OFDM symbols per slot.

In some implementations, the plurality of parameters can include all the parameters needed for the RU to generate the CSI RS for transmission to the UE.

In some implementations, the CSI RS can be generated at the RU using the CSI RS configuration information, and the generated CSI RS can be transmitted from the RU to the UE. Further, after the transmission of the generated CSI RS, CSI can be received at the RU from the UE, and the RU can transmit the CSI to the DU for decoding.

In some implementations, the wireless communication system can be an LTE communication system or a 5G communication system.

In some implementations, the base station can be an eNodeB or a gNodeB.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. An apparatus, comprising:
   at least one processor, and
   at least one non-transitory storage media storing instructions that, when executed by the at least one processor, cause the at least one processor to perform operations comprising:
   receiving, at a radio unit (RU) of a base station in a wireless communication system, a message including channel state information reference signal (CSI RS) configuration information that the RU is configured to use in generating a CSI RS for transmission to a user equipment (UE);
   wherein the CSI RS configuration information includes a plurality of parameters comprising a bandwidth for CSI RS transmission, amplitude scaling, and a scrambling identity (ID).

2. The apparatus of claim 1, wherein the message is a control plane (C-plane) message.

3. The apparatus of claim 2, wherein the message is of a section type or a section extension type that defines the plurality of parameters included in the CSI-RS configuration information.

4. The apparatus of claim 2, wherein the operations further comprise transmitting the message to the RU from a distributed unit (DU) of the base station; and
   the message provides real time C-plane control to the RU.

5. The apparatus of claim 1, wherein the message is a management plane (M-plane) message.

6. The apparatus of claim 5, wherein the operations further comprise the RU indicating support of the CSI-RS configuration information in a feature in a yang model.

7. The apparatus of claim 1, wherein the plurality of parameters further comprise ports, density, code division multiplexing type, orthogonal frequency-division multiplexing (OFDM) symbol number within a slot, slot number within a radio frame, and number of OFDM symbols per slot.

8. The apparatus of claim 1, wherein the plurality of parameters include all the parameters needed for the RU to generate the CSI RS for transmission to the UE.

9. The apparatus of claim 1, wherein the operations further comprise generating, at the RU and using the CSI RS configuration information, the CSI RS; and
   transmitting the generated CSI RS from the RU to the UE.

10. The apparatus of claim 9, wherein the operations further comprise, after the transmission of the generated CSI RS, receiving CSI at the RU from the UE, and the RU transmitting the CSI to the DU for decoding.

11. The apparatus of claim 1, wherein the wireless communication system is a long term evolution (LTE) communication system or a 5G communication system.

12. The apparatus of claim 1, wherein the base station is an eNodeB or a gNodeB.

13. A computer-implemented method, comprising:
    receiving, at a radio unit (RU) of a base station in a wireless communication system, a message including channel state information reference signal (CSI RS) configuration information that the RU is configured to use in generating a CSI RS for transmission to a user equipment (UE);
    wherein the CSI RS configuration information includes a plurality of parameters comprising a bandwidth for CSI RS transmission, amplitude scaling, and a scrambling identity (ID).

14. The method of claim 13, wherein the message is a control plane (C-plane) message.

15. The method of claim 13, wherein the message is a management plane (M-plane) message.

16. The method of claim 13, wherein the plurality of parameters include all the parameters needed for the RU to generate the CSI RS for transmission to the UE.

17. At least one non-transitory storage media storing instructions that, when executed by at least one processor, cause the at least one processor to perform operations comprising:
    receiving, at a radio unit (RU) of a base station in a wireless communication system, a message including channel state information reference signal (CSI RS) configuration information that the RU is configured to use in generating a CSI RS for transmission to a user equipment (UE);
    wherein the CSI RS configuration information includes a plurality of parameters comprising a bandwidth for CSI RS transmission, amplitude scaling, and a scrambling identity (ID).

18. The storage media of claim 17, wherein the message is a control plane (C-plane) message.

19. The storage media of claim 17, wherein the message is a management plane (M-plane) message.

20. The storage media of claim 17, wherein the plurality of parameters include all the parameters needed for the RU to generate the CSI RS for transmission to the UE.

* * * * *